United States Patent
Hjerpe et al.

(10) Patent No.: US 8,381,862 B2
(45) Date of Patent: Feb. 26, 2013

(54) PEDAL ARRANGEMENT FOR A MOTOR VEHICLE

(75) Inventors: Erik Hjerpe, Torslanda (SE); Christian Forsberg, Gothenburg (SE)

(73) Assignee: Autoliv Development AB, Vargarda (SE)

( * ) Notice: Subject to any disclaimer, the term of this patent is extended or adjusted under 35 U.S.C. 154(b) by 188 days.

(21) Appl. No.: 12/970,359

(22) Filed: Dec. 16, 2010

(65) Prior Publication Data

US 2011/0308349 A1  Dec. 22, 2011

(30) Foreign Application Priority Data

Dec. 17, 2009  (DE) .......................... 10 2009 059 000

(51) Int. Cl.
 *B60T 7/22* (2006.01)
(52) U.S. Cl. ............................ 180/274; 74/512; 74/560
(58) Field of Classification Search ................. 180/271, 180/274; 280/748; 74/512, 560
See application file for complete search history.

(56) References Cited

U.S. PATENT DOCUMENTS

| | | | | |
|---|---|---|---|---|
| 3,388,610 A * | 6/1968 | Pyle et al. | ........................ | 74/512 |
| 5,261,515 A * | 11/1993 | Butkus et al. | ................... | 192/28 |
| 5,881,608 A * | 3/1999 | Laue | ............................ | 74/579 R |
| 5,934,151 A * | 8/1999 | Carr et al. | ........................ | 74/512 |
| 5,970,817 A * | 10/1999 | Ichiba | ............................. | 74/512 |
| 6,182,525 B1 * | 2/2001 | Bowers et al. | ................... | 74/512 |
| 6,393,934 B1 * | 5/2002 | Rixon et al. | ..................... | 74/512 |
| 6,758,129 B2 * | 7/2004 | Dreischarf et al. | ............... | 92/84 |
| 7,185,918 B2 * | 3/2007 | Riefe et al. | ..................... | 280/777 |
| 7,191,682 B2 * | 3/2007 | Sando | ............................. | 74/560 |
| 7,340,977 B2 * | 3/2008 | Agnew et al. | ................... | 74/512 |
| 7,441,478 B2 * | 10/2008 | Burgstaler et al. | ............... | 74/512 |
| 7,458,293 B2 * | 12/2008 | Terradas et al. | ................. | 74/512 |
| 7,497,144 B2 * | 3/2009 | Yoon | ............................... | 74/512 |
| 7,540,218 B2 * | 6/2009 | Podkopayev | .................... | 74/512 |
| 7,730,989 B2 * | 6/2010 | Canals Riba et al. | ......... | 180/274 |
| 7,815,007 B2 * | 10/2010 | Mori et al. | ...................... | 180/274 |
| 7,926,383 B2 * | 4/2011 | Choi et al. | ....................... | 74/512 |
| 7,954,589 B2 * | 6/2011 | Sand et al. | ...................... | 180/274 |
| 7,987,743 B2 * | 8/2011 | Sukonthapanich | ............. | 74/512 |
| 2001/0027889 A1 * | 10/2001 | Thistleton | ..................... | 180/271 |
| 2001/0047695 A1 * | 12/2001 | Ichiba | ............................. | 74/512 |
| 2002/0002874 A1 * | 1/2002 | Burton et al. | ................... | 74/512 |
| 2002/0174739 A1 * | 11/2002 | Cordero | .......................... | 74/560 |
| 2003/0084749 A1 * | 5/2003 | Orr et al. | ......................... | 74/560 |
| 2005/0204855 A1 * | 9/2005 | Fujiwara et al. | ................ | 74/512 |

(Continued)

FOREIGN PATENT DOCUMENTS

DE  19515852 C2  11/2001
EP  0877685 B1  4/2002

(Continued)

*Primary Examiner* — Joseph Rocca
*Assistant Examiner* — Darlene P Condra
(74) *Attorney, Agent, or Firm* — Harness, Dickey & Pierce, P.L.C.

(57) ABSTRACT

A pedal arrangement for a motor vehicle includes a pedal arm connected to the vehicle structure via a first pivotal joint connection and connected to a force transmitting element via a second pivotal joint connection. The pedal arrangement further includes a pyrotechnically driven release arrangement. The release arrangement is adapted to perform a release movement in order to release the second pivotal joint connection upon being driven in response to a corresponding activation signal. The release movement of the release arrangement is based on a translational movement essentially along the pedal arm.

19 Claims, 7 Drawing Sheets

U.S. PATENT DOCUMENTS

| | | | |
|---|---|---|---|
| 2006/0053948 A1* | 3/2006 | Mahendra et al. | 74/512 |
| 2006/0169092 A1* | 8/2006 | Prat Terradas et al. | 74/512 |
| 2007/0137398 A1* | 6/2007 | Tokumo et al. | 74/512 |
| 2007/0234841 A1* | 10/2007 | Tokumo et al. | 74/512 |
| 2007/0266815 A1* | 11/2007 | Johansson | 74/512 |
| 2008/0307920 A1* | 12/2008 | Fujiwara | 74/512 |
| 2009/0229402 A1* | 9/2009 | Khan et al. | 74/512 |
| 2010/0037725 A1* | 2/2010 | Andersson et al. | 74/512 |
| 2010/0043592 A1* | 2/2010 | Johansson | 74/560 |

FOREIGN PATENT DOCUMENTS

WO    WO 9962748 A1 * 12/1999

\* cited by examiner

PEDAL ARRANGEMENT FOR A MOTOR VEHICLE

CROSS-REFERENCE TO RELATED APPLICATIONS

This application claims the benefit and priority of DE 10 2009 059000.5, filed 17 Dec. 2009. The entire disclosure of the above application is incorporated herein by reference.

FIELD

The present disclosure relates to a pedal arrangement for a motor vehicle, comprising a pedal arm connected to the vehicle structure via a first pivotal joint connection and connected to a force transmitting element via a second pivotal joint connection, said pedal arrangement further comprising a pyrotechnically driven release arrangement, wherein said release arrangement is adapted to perform a release movement in order to release said second pivotal joint connection upon being driven in response to a corresponding activation signal.

BACKGROUND

This section provides background information related to the present disclosure which is not necessarily prior art.

Due to the release of the connection between the force transmitting element and the pedal arm, the pedal can move freely away from the driver which reduces the injury risk of the driver in the foot region in an accident.

DE 195 15 852 C2 discloses a pedal arrangement according to the preamble of claim 1 with a swivelling part pivotably connected in the first pivotal joint and comprising a reception for an end of the force transmitting element. Upon activation the swivelling part is forced to swivel around the first pivotal point, thereby removing the reception and releasing the connection between the force transmitting element and the pedal arm.

EP 0 877 685 B1 discloses another pedal arrangement according to the preamble of claim 1 with a pyrotechnically driven rotatable plate mounted between the force transmitting rod and the pedal arm. Ignition of a powder charge causes the plate to rotate, whereby tongues of the plate push the force transmitting rod axially of a shaft and thereby release the force transmitting rod from the pedal arm.

SUMMARY

This section provides a general summary of the disclosure, and is not a comprehensive disclosure of its full scope or all of its features.

The object of the invention is to provide a pedal arm arrangement with a simple, robust and reliable release arrangement.

The invention solves this object with the features of the independent claims. The translational movement of the release arrangement essentially along the pedal arm is mainly perpendicular to the vehicle movement direction, so that disturbances caused by the enormous forces acting in the vehicle movement direction can be reduced and the reliability can be significantly enhanced. Furthermore, the usually linear movement of the pyrotechnical actuator can be particularly easily transformed into a translational movement of the release arrangement.

The release movement being based on a translational movement means in particular that the part in the release arrangement directly acting on the second pivot joint is performing a translational movement. Preferably all moving parts of the release arrangement between the pyrotechnical actuator and the second pivot joint are based on a translational movement, leading to a particularly simple release arrangement.

In a preferred embodiment the release arrangement performs a translational movement of an end of said force transmitting element. This allows a very robust design of the release arrangement. Furthermore, the number of parts can be reduced.

Preferably the pedal arm comprises an aperture for allowing the force transmitting element to penetrate through upon release. In this case no lateral movement between the force transmitting element and the pedal arm is required to allow free movement of the pedal arm. However, an aperture in the pedal arm for the force transmitting element is not strictly required. Alternatively means for guiding the force transmitting element laterally relative to the pedal arm may be provided.

In another embodiment the release arrangement may comprise a translationally movable sliding element, in particular a part of a cup provided in said pedal arm for receiving an end of said force transmitting element, which sliding element is preferably movable from a blocking position in which it is arranged to block an aperture in the pedal arm, to a release position in which it is arranged to uncover the aperture in the pedal arm.

Preferably the pedal arrangement comprises a force limiting element arranged to act between said pedal arm and said force transmitting element, in order to avoid a high acceleration and an unwanted rebound of the pedal after release.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The pedal arrangement 10, in particularly a foot pedal in a motor vehicle, like brake pedal or clutch pedal, comprises a pedal arm 11 which is pivotably connected to the vehicle structure via a first pivotal joint 12. A force exerted by the driver to the pedal arm 11 is transmitted to a brake booster 13 and the main brake cylinder 14 via a push rod 15 which is pivotably connected to the pedal arm 11 via a second pivotal joint 16. The second pivotal joint 16 is for example formed by a swivel head 17 mounted to one end of the push rod 15, which is held in a spherical cup 18 provided in said pedal arm 11. The swivel head 17 forms the proximal end of the push rod 15. In an alternative embodiment a pull rod 15 may be employed if the positions of the first and second swivel joints 12, 16 are exchanged.

The pedal arrangement 10 comprises a release arrangement 19 with a pyrotechnical actuator 20 which is activatable in response to a corresponding activation signal provided for example from a vehicle impact sensor. In the preferred embodiment shown in FIGS. 1A to 1C the pyrotechnical activator 20 is connected to the pedal arm 11 and acts on the proximal end 17 of the push rod 15 via a drive means 21. The proximal end 17 of push rod 15 is movably guided in the pedal arm 11 for a translational movement essentially along the pedal arm 11.

Figure 1A:
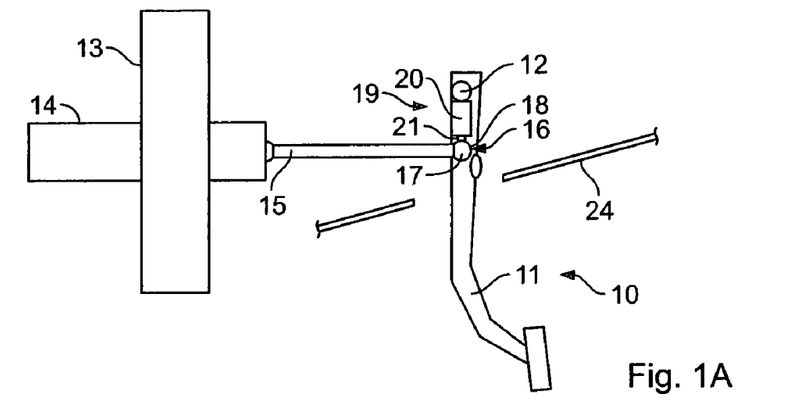
FIGS. 1A-1C show a pedal arrangement according to a preferred embodiment of the invention in different states.

FIG. 1A shows the pedal arrangement 10 in a normal operation state.

Figure 1B:
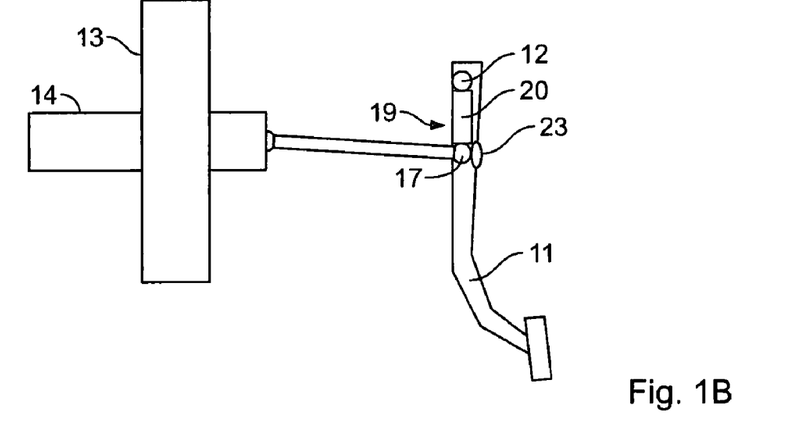
Figure 1C:
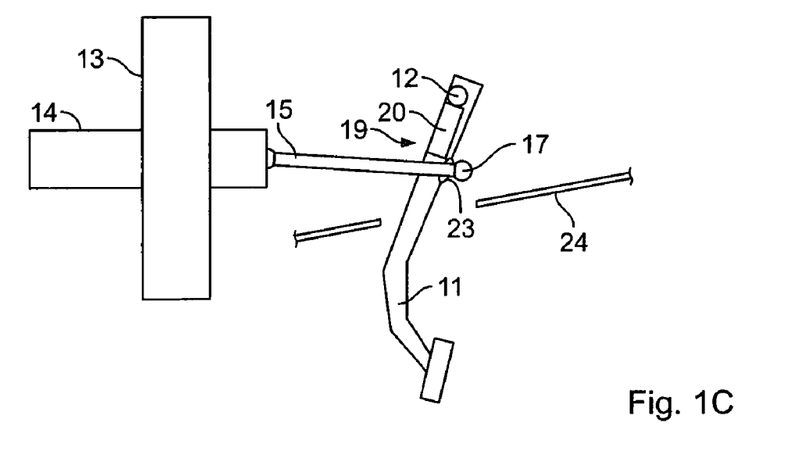

Upon activation in particular in response to a vehicle impact signal, the pyrotechnical activator 20 drives the drive means 21 downwards along the pedal arm 11. The drive means 21 forces the proximal end of the push rod 15 downwards to a position where the push rod 15 reaches an aperture 23 provided in the pedal arm 11 at the front side thereof. The diameter of the aperture 23 is larger than the diameter of the swivel head 17 such that the push rod 15 can penetrate through the aperture 23 to the front side of the pedal arm 11, see FIG. 1C. In other words, the pedal arm 11 is released from the push rod 15 and can freely swing away from the driver, thus reducing the injury risk of the driver in the foot region. The release means 19 and the aperture 23 are preferably arranged above or behind a cover 24 such that there is no injury risk to the driver by the released push rod 15.

Figure 2A:
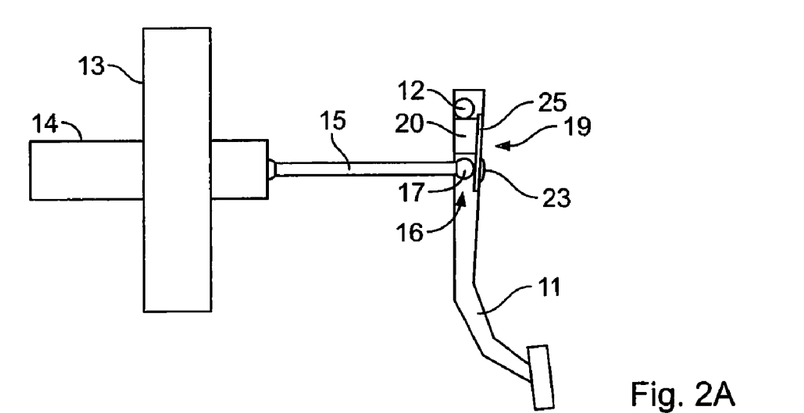
FIGS. 2A-2C show a pedal arrangement according to another embodiment of the invention in different states.
Figure 2B:
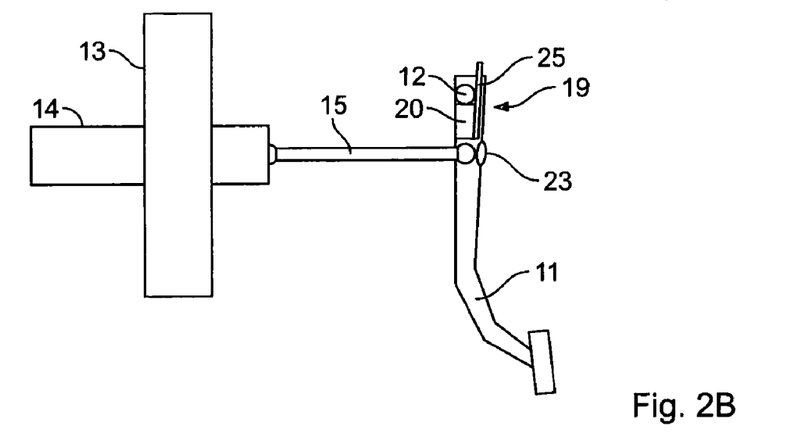
Figure 2C:
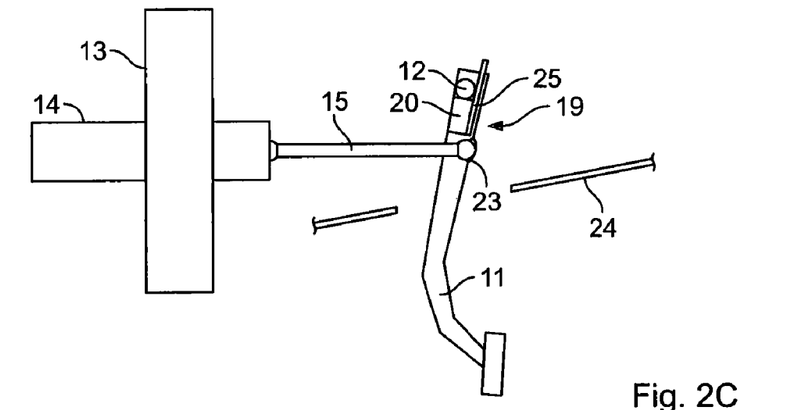

In the embodiment shown in FIGS. 2A to 2C the pyrotechnical activator 20 does not act on the push rod 15 but on a slide member 25 movably guided in the pedal arm 11 for a translational movement essentially along the pedal arm 11. In the normal operation state shown in FIG. 2A the slide member 25 blocks the aperture 23. Upon activation the pyrotechnical activator 20 causes the sliding member 25 to move essentially along the pedal arm 11 in order to uncover the aperture 23, see FIG. 2B, allowing the push rod 15 to penetrate through the aperture 23 as shown in FIG. 2C.

Figure 3A:
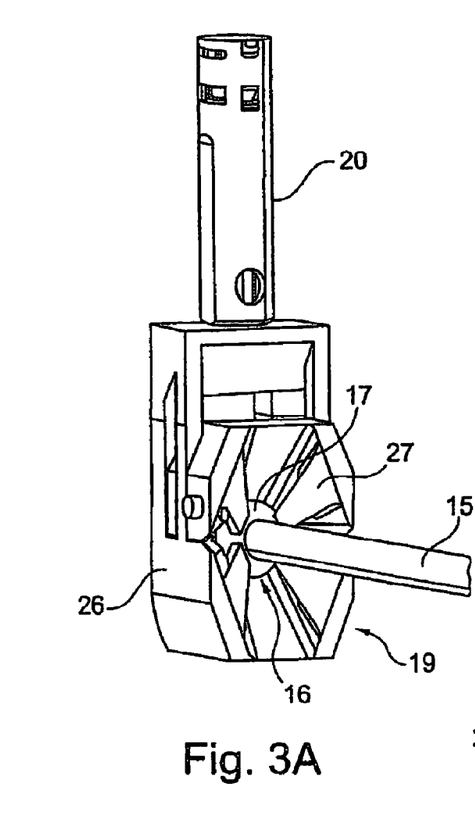
FIGS. 3A-3C show a perspective view on a release arrangement for a pedal arrangement according to a further embodiment of the invention in different states.
Figure 3B:
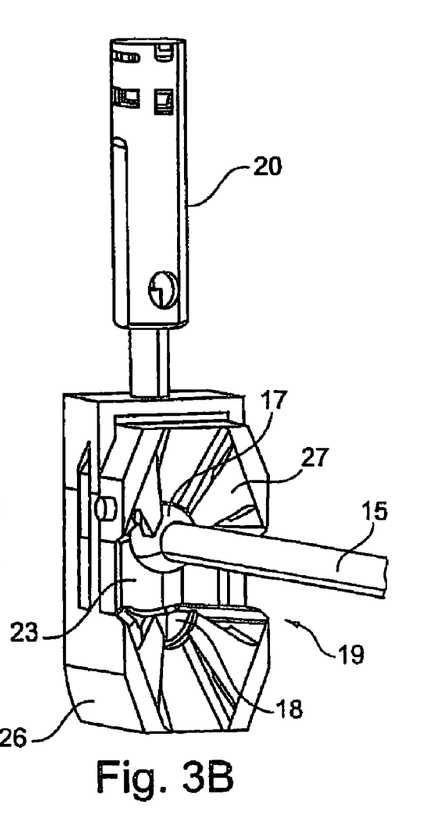
Figure 3C:
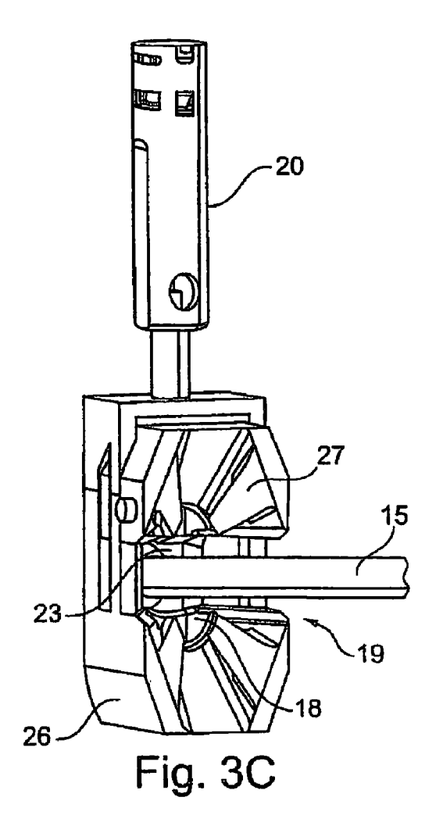
Figure 4A:
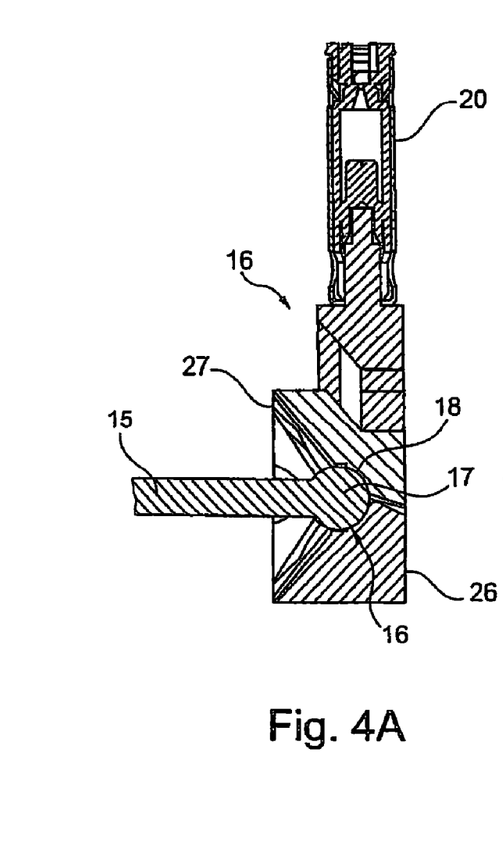
FIGS. 4A-4C show the release arrangement of FIGS. 3A-3C in a sectional view.
Figure 4B:
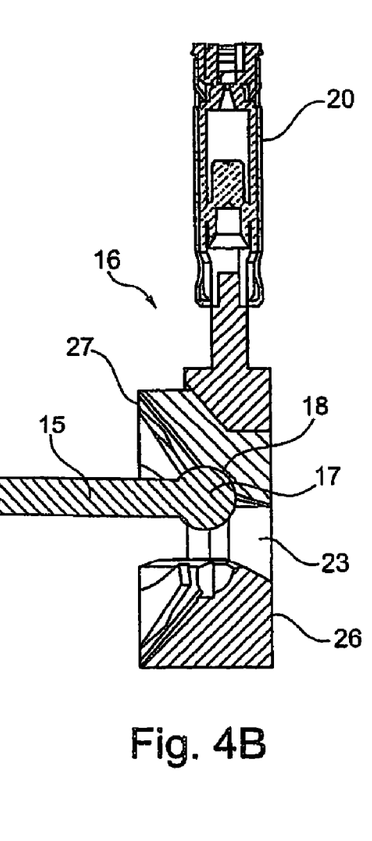
Figure 4C:
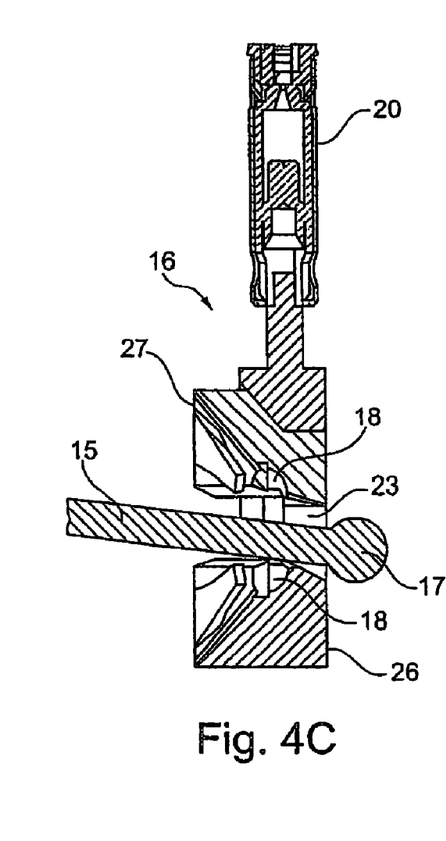

FIGS. 3A to 3C and 4A to 4C show a further embodiment where the cup 18 for the swivel head 17 is formed by two cup forming members 26, 27 each of which for example forms a half of the cup 18. In the present embodiment one cup-forming member 27 is fixedly mounted to the pedal arm 11 while the other cup-forming member 26 is movably guided in the pedal arm 11 for a translational movement essentially along the pedal arm 11. Upon activation the pyrotechnical activator 20 causes the sliding member 27 to move essentially along the pedal arm 11, thereby effectively splitting the cup 18, in order to uncover the aperture 23 through the sliding member 27 and the pedal arm 11, see FIG. 3B, allowing the push rod 15 to penetrate through the aperture 23 as shown in FIG. 3C.

In an embodiment not shown in the Figures both cup-forming members 26, 27 may be movably guided along the pedal arm 11 in opposite directions, and the pyrotechnical activator 20 may be arranged to split the cup 18 by causing both cup-forming members to move along the pedal arm 11 in opposite directions in order to uncover the aperture 23.

Figure 5A:
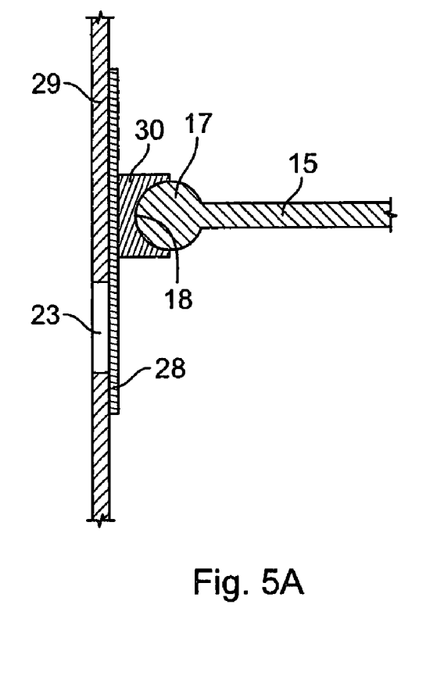
FIGS. 5A-5C show a force limiting element for a release arrangement according to the invention.
Figure 5B:
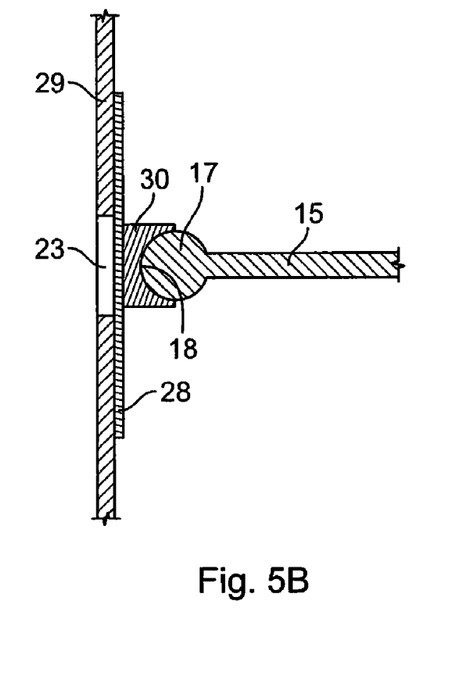
Figure 5C:
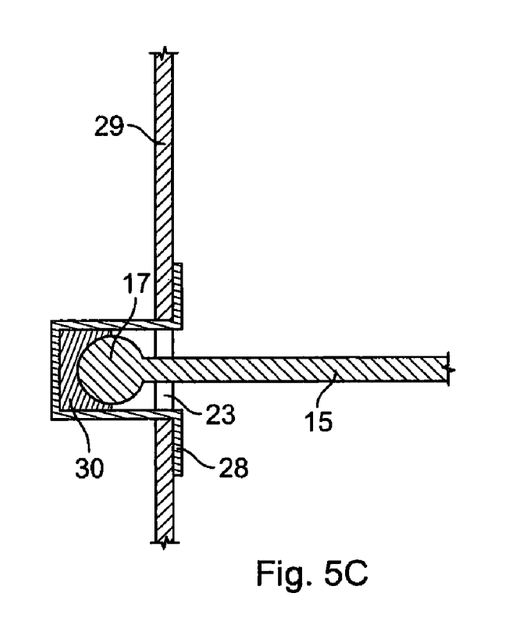

FIGS. 5A to 5C show a bendable, preferably metallic strip element 28 which is arranged between a front part 29 of the pedal arm 11 and a cup-forming member 30 forming the cup 18. The release arrangement functions as described with reference to FIGS. 1A to 1C. When the position in FIG. 5B corresponding to FIG. 1B is reached, the strip element 28 starts to deform while being pressed through the aperture 23 together with the push rod 15, see FIG. 5C. Due to the force limiting element 28 high accelerations of the released pedal arm 11 and an unwanted rebound of the pedal arm 11 can be avoided.

Figure 6A:
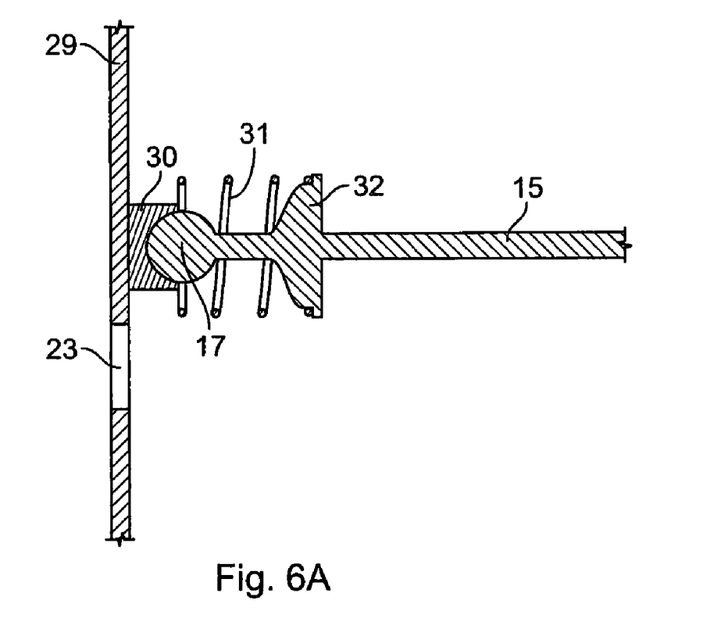
FIGS. 6A, 6B show another force limiting element for a release arrangement according to the invention.
Figure 6B:
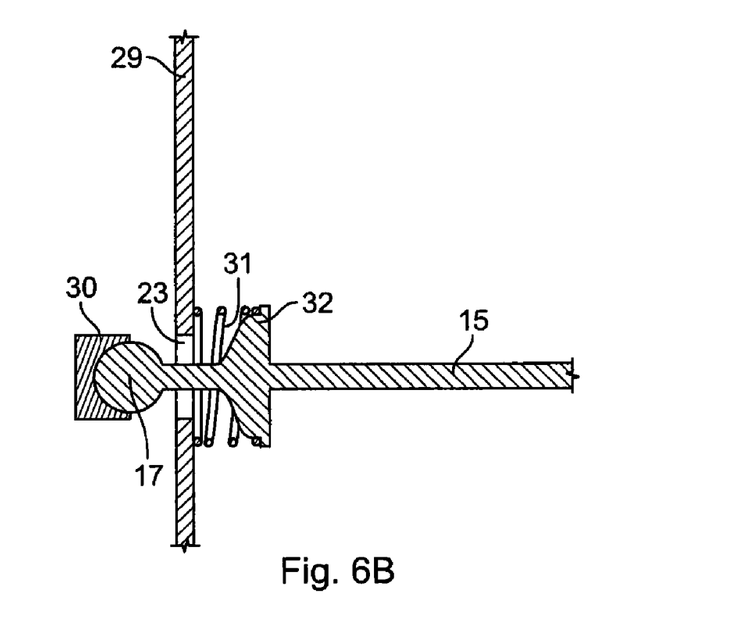

FIGS. 6A and 6B show another embodiment of a deformable force limiting element 31 in the form of a spring which in the released state shown in FIG. 6B acts between the part 29 of the pedal arm 11 and a collar 32 of the push rod 15. The deformable element 31 may show essentially plastic behaviour reducing the risk of rebound of the pedal arm 11 after release. On the other hand, a deformable element 31 showing an elastic behaviour enables braking even after release of the pedal arm 11. Therefore, it may be advantageous if the deformable element 31 shows a plastic-elastic behaviour which may be achieved by a combination of materials.

Figure 7A:
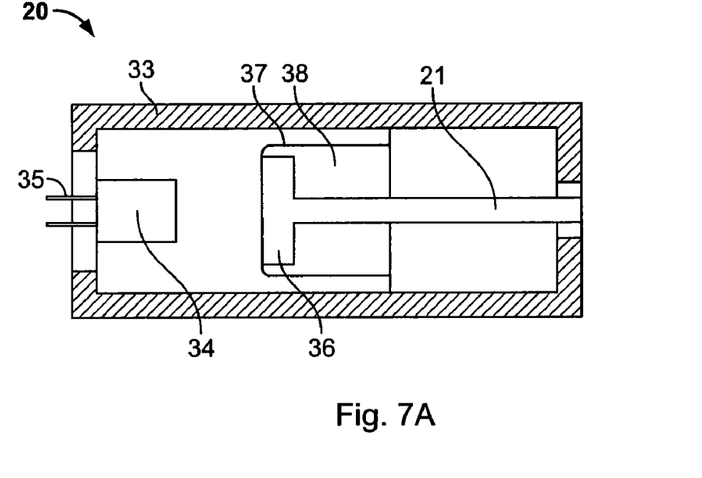
FIGS. 7A, 7B show a pyrotechnical activator for a release arrangement according to the invention.
Figure 7B:
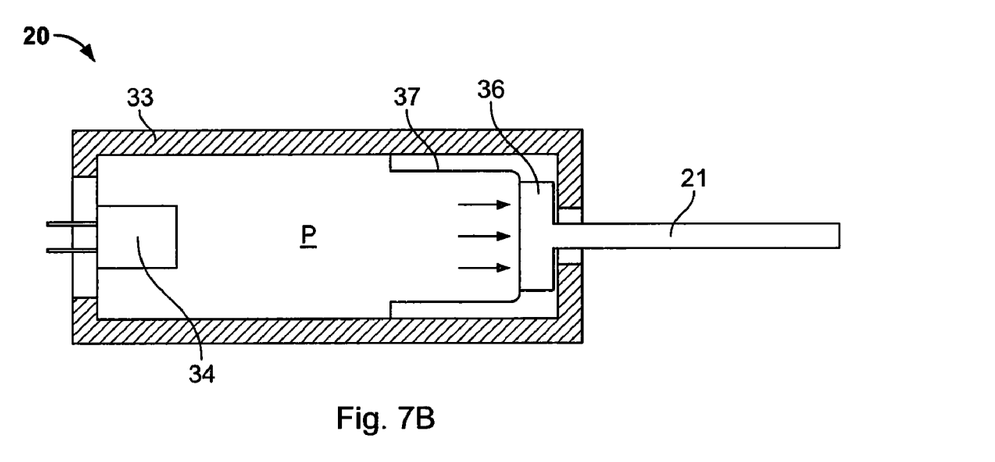

FIGS. 7Aa and 7B show a preferred embodiment of a pyrotechnical activator 20 for a release arrangement 19 according to the invention. The activator 20 comprises a container 33 containing a pyrotechnical charge 34 having connectors 35 mounted at a first end and a piston 36 connected to a rod-shaped drive means 21 which is guided through an opening of the container 33 at the opposite end thereof. The container 33 furthermore comprises an indented member 37 forming an indented region 38 in which the piston 36 is received in an initial state. Upon ignition of the pyrotechnical charge 34 the indented member 37 expands axially towards the opposite end of the container 33 in order to move the piston 36 and the drive means 21. The container 33 of the release arrangement 19 encapsulates pyrotechnical residues after deployment. The closed design associated with the indented member 37 provides shielding to the environment before and after deployment. The container 33 is preferably partly encapsulated by a sleeve which guides the expansion of the indented member 37, restricts the piston 36 stroke, and stops the piston 36 from becoming a loose part.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pedal arrangement for a motor vehicle, the pedal arrangement comprising:

a pedal arm for connection to a vehicle structure via a first pivotal joint connection and for connection to a force transmitting element via a second pivotal joint connection; and a pyrotechnically driven release arrangement, the release arrangement adapted to perform a release movement in order to release the second pivotal joint connection upon being driven in response to a corresponding activation signal; wherein the release arrangement comprises a sliding element translationally movable essentially along the pedal arm; wherein the pedal arm comprises an aperture for allowing the force transmitting element to penetrate through upon release.

2. The pedal arrangement according to claim 1, wherein the release arrangement is adapted to perform a translational movement of an end of the force transmitting element.

3. The pedal arrangement according to claim 1, wherein the sliding element is movable from a blocking position in which it is arranged to block an aperture in the pedal arm to a release position in which it is arranged to uncover the aperture.

4. The pedal arrangement according to claim 1, wherein the sliding element is a cup-forming member forming part of a cup provided in the pedal arm for receiving an end of the force transmitting element.

5. The pedal arrangement according to claim 4, wherein the cup is arranged to split into a plurality of parts upon action of the release arrangement.

6. The pedal arrangement according to claim 1, further comprising a force limiting element arranged to act between the pedal arm and the force transmitting element.

7. The pedal arrangement according to claim 6, wherein the force limiting element comprises a bendable strip element arranged to be moved through a release opening in the pedal arm by the force transmitting element after release of the second pivotal joint connection.

8. The pedal arrangement according to claim 6, wherein the force limiting element comprises a deformable element arranged between the force transmitting element and the pedal arm.

9. A pedal arrangement for a motor vehicle, the pedal arrangement comprising:
 a pedal arm for connection to a vehicle structure via a first pivotal joint connection and for connection to a force transmitting element via a second pivotal joint connection;
 a pyrotechnically driven release arrangement, the release arrangement adapted to perform a release movement in order to release the second pivotal joint connection upon being driven in response to a corresponding activation signal; and
 a pyrotechnical actuator with a container containing a pyrotechnical charge, a movable member and an indented member receiving the movable member in an initial state, wherein the indented member is arranged to expand axially towards the movable member upon ignition of the pyrotechnical charge in order to move the movable member.

10. A pedal arrangement for a motor vehicle, the pedal arrangement comprising:
 a pedal arm for connection to a vehicle structure via a first pivotal joint connection and connected to a force transmitting element via a second pivotal joint connection;
 a pyrotechnically driven release arrangement, the release arrangement adapted to perform a release movement in order to release the second pivotal joint connection upon being driven in response to a corresponding activation signal; and
 a force limiting element arranged to act between the pedal arm and the force transmitting element in order to avoid high acceleration and an unwanted rebound of the pedal after release the force limiting element selected from a group consisting of:
  a bendable strip element arranged to be moved through a release opening in the pedal arm by the force transmitting element after release of the second pivotal joint connection; and
  a deformable element arranged between the force transmitting element and the pedal arm.

11. The pedal arrangement according to claim 10, wherein the release arrangement is adapted to perform a translational movement of an end of the force transmitting element.

12. The pedal arrangement according to claim 10, wherein the pedal arm comprises an aperture for allowing the force transmitting element to penetrate through upon release.

13. The pedal arrangement according to claim 10, wherein the release arrangement comprises a sliding element translationally movable essentially along the pedal arm.

14. The pedal arrangement according to claim 13, wherein the sliding element is movable from a blocking position in which it is arranged to block an aperture in the pedal arm to a release position in which it is arranged to uncover the aperture.

15. The pedal arrangement according to claim 13, wherein the sliding element is a cup-forming member forming part of a cup provided in the pedal arm for receiving an end of the force transmitting element.

16. The pedal arrangement according to claim 10, wherein the force limiting element is the bendable strip element.

17. The pedal arrangement according to claim 10, wherein the force limiting element is the deformable element.

18. The pedal arrangement according to claim 10, further comprising a pyrotechnical actuator with a container containing a pyrotechnical charge, a movable member and an indented member receiving the movable member in an initial state, wherein the indented member is arranged to expand axially towards the movable member upon ignition of the pyrotechnical charge in order to move the movable member.

19. The pedal arrangement according to claim 10, in combination with the motor vehicle.

* * * * *